US008530370B2

(12) United States Patent
Donaho et al.

(10) Patent No.: US 8,530,370 B2
(45) Date of Patent: *Sep. 10, 2013

(54) NANO-TETRATHIOMETALLATE OR NANO-TETRASELENOMETALLATE MATERIAL

(75) Inventors: Charles Roy Donaho, Richmond, TX (US); Michael Anthony Reynolds, Katy, TX (US)

(73) Assignee: Shell Oil Company, Houston, TX (US)

( * ) Notice: Subject to any disclaimer, the term of this patent is extended or adjusted under 35 U.S.C. 154(b) by 265 days.

This patent is subject to a terminal disclaimer.

(21) Appl. No.: 13/010,894

(22) Filed: Jan. 21, 2011

(65) Prior Publication Data
US 2011/0177336 A1 Jul. 21, 2011

Related U.S. Application Data

(60) Provisional application No. 61/297,065, filed on Jan. 21, 2010.

(51) Int. Cl.
*B01J 31/00* (2006.01)
*B01J 27/057* (2006.01)
*B01J 27/02* (2006.01)
*B01J 27/047* (2006.01)
*B01J 27/049* (2006.01)
*B01J 27/051* (2006.01)
*B01J 27/043* (2006.01)
*B01J 27/045* (2006.01)

(52) U.S. Cl.
USPC ........... 502/215; 502/168; 502/216; 502/219; 502/220; 502/221; 502/222; 502/223

(58) Field of Classification Search
USPC ........................ 502/168, 215, 216, 219–223
See application file for complete search history.

(56) References Cited

U.S. PATENT DOCUMENTS

| | | | |
|---|---|---|---|
| 3,458,433 A | 7/1969 | Wood et al. ...................... 208/89 |
| 3,904,513 A | 9/1975 | Fischer et al. .................. 208/264 |
| 4,208,271 A | 6/1980 | Cosyns et al. .................. 208/255 |
| 4,243,553 A | 1/1981 | Naumann et al. .............. 252/439 |
| 4,243,554 A | 1/1981 | Naumann et al. .............. 252/439 |
| 4,424,142 A | 1/1984 | Asaoka et al. ................... 502/84 |
| 4,425,278 A | 1/1984 | Wirth et al. ................ 260/429 R |
| 4,454,024 A | 6/1984 | Singhal et al. ................. 208/111 |
| 4,491,639 A * | 1/1985 | Happel et al. .................. 502/219 |
| 4,510,260 A * | 4/1985 | Stiefel et al. ................... 502/219 |
| 4,514,517 A | 4/1985 | Ho et al. ........................ 502/220 |
| 4,547,321 A | 10/1985 | Stiefel et al. ..................... 556/14 |
| 4,557,821 A | 12/1985 | Lopez et al. ................... 208/108 |
| 4,581,125 A | 4/1986 | Stiefel et al. .................. 208/108 |
| 4,596,785 A | 6/1986 | Toulhoat et al. .............. 502/220 |
| 4,626,339 A | 12/1986 | Chianelli et al. ................ 208/18 |
| 4,632,747 A | 12/1986 | Ho et al. ......................... 208/19 |
| 4,650,563 A | 3/1987 | Jacobson et al. .............. 208/108 |
| 4,666,878 A | 5/1987 | Jacobson et al. .............. 502/221 |
| 4,668,376 A | 5/1987 | Young et al. .................. 208/108 |
| 4,695,369 A | 9/1987 | Garg et al. ..................... 208/112 |
| 4,698,145 A | 10/1987 | Ho et al. ......................... 208/18 |
| 4,721,558 A | 1/1988 | Jacobson et al. .............. 208/108 |
| 4,724,068 A | 2/1988 | Stapp ............................ 208/213 |
| 4,748,142 A | 5/1988 | Chianelli et al. .............. 502/220 |
| 4,755,496 A | 7/1988 | Ho et al. ........................ 502/165 |
| 4,792,541 A | 12/1988 | Ho et al. ........................ 502/167 |
| 4,795,731 A | 1/1989 | Pecoraro et al. .............. 502/221 |
| 4,801,570 A | 1/1989 | Young et al. .................. 502/220 |
| 4,820,677 A * | 4/1989 | Jacobson et al. .............. 502/220 |
| 4,824,820 A | 4/1989 | Jacobson et al. .............. 502/219 |
| 5,122,258 A * | 6/1992 | Eadie et al. .................... 208/112 |
| 5,158,982 A | 10/1992 | Stapp ............................... 521/41 |
| 5,186,818 A | 2/1993 | Daage et al. ............... 208/254 H |
| 5,332,489 A | 7/1994 | Veluswamy ..................... 208/56 |
| 5,382,349 A | 1/1995 | Yoshita et al. ................... 208/49 |
| 5,484,755 A | 1/1996 | Lopez ............................ 502/219 |
| 5,872,073 A | 2/1999 | Hilsenbeck et al. ........... 502/220 |
| 6,149,799 A * | 11/2000 | Raybaud et al. ................. 208/49 |
| 6,248,687 B1 | 6/2001 | Itoh et al. ...................... 502/216 |
| 6,623,623 B2 | 9/2003 | Kalnes ............................ 208/89 |
| 7,214,309 B2 | 5/2007 | Chen et al. ................. 208/111.3 |
| 7,238,273 B2 | 7/2007 | Chen et al. ...................... 208/49 |

(Continued)

FOREIGN PATENT DOCUMENTS

| | | |
|---|---|---|
| CA | 1248514 | 1/1989 |
| EP | 0133031 | 2/1985 |

(Continued)

OTHER PUBLICATIONS

"The Build-Up of Bimetallic Transition Metal Clusters," P. Raithby. Platinum Metals rv., 1998, 42, (4), pp. 146-157.*

(Continued)

*Primary Examiner* — Patricia L Hailey

(57) ABSTRACT

The present invention is directed to a composition comprising a solid material comprised of a first metal/metalloid comprised of a metal or metalloid selected from the group consisting of Cu, Fe, Ag, Co, Mn, Zr, Zn, Sn, Re, Rh, Ru, Pd, Ir, Pt, B, Al, Ce, La, Pb, Cd, Sb, Ge, Ga, In, Bi, and Au; and a second metal selected from molybdenum, tungsten, or vanadium, where the first metal/metalloid and the second metal form a bimetallic tetrathiometallate or a bimetallic tetraselenometallate with sulfur or with selenium. The solid material is comprised of particles and has a particle size distribution, where the mean particle size of the particle size distribution is from about 50 nm to about 5 μm.

17 Claims, No Drawings

(56) References Cited

U.S. PATENT DOCUMENTS

| | | | |
|---|---|---|---|
| 7,396,799 B2 | 7/2008 | Chen et al. | 502/216 |
| 7,402,547 B2 | 7/2008 | Wellington et al. | 502/222 |
| 7,410,928 B2 | 8/2008 | Chen et al. | 502/216 |
| 7,416,653 B2 | 8/2008 | Wellington et al. | 208/108 |
| 7,431,822 B2 | 10/2008 | Farshid et al. | 208/57 |
| 7,431,824 B2 | 10/2008 | Chen et al. | 208/108 |
| 7,431,831 B2 | 10/2008 | Farshid et al. | 208/423 |
| 7,678,730 B2 * | 3/2010 | Mironov et al. | 502/200 |
| 7,763,160 B2 | 7/2010 | Wellington et al. | 208/14 |
| 7,811,445 B2 | 10/2010 | Wellington et al. | 208/14 |
| 7,828,958 B2 | 11/2010 | Wellington et al. | 208/14 |
| 7,854,833 B2 | 12/2010 | Wellington et al. | 208/108 |
| 7,879,223 B2 | 2/2011 | Wellington et al. | |
| 2006/0058174 A1 | 3/2006 | Chen et al. | 502/3 |
| 2006/0157385 A1 | 7/2006 | Montanari et al. | 208/49 |
| 2007/0138055 A1 | 6/2007 | Farshid et al. | 208/49 |
| 2007/0138057 A1 | 6/2007 | Farshid et al. | 208/57 |
| 2007/0140927 A1 | 6/2007 | Reynolds | |
| 2007/0238607 A1 | 10/2007 | Alonso et al. | 502/177 |
| 2008/0305947 A1 | 12/2008 | Chen et al. | 502/217 |
| 2009/0057193 A1 | 3/2009 | Farshid et al. | 208/56 |
| 2009/0057194 A1 | 3/2009 | Farshid et al. | 208/56 |
| 2009/0057195 A1 | 3/2009 | Powers et al. | 208/59 |
| 2011/0174685 A1 * | 7/2011 | Reynolds et al. | 208/100 |

FOREIGN PATENT DOCUMENTS

| | | |
|---|---|---|
| EP | 0546686 | 6/1993 |
| FR | 2130297 | 3/1972 |
| GB | 630204 | 10/1949 |
| JP | H08199173 | 8/1996 |
| WO | WO2005082382 | 9/2005 |
| WO | WO2007059621 | 5/2007 |
| WO | WO2008014947 | 2/2008 |
| WO | WO2008141830 | 11/2008 |
| WO | WO2008141831 | 11/2008 |
| WO | WO2008151792 | 12/2008 |
| WO | WO2009003633 | 1/2009 |
| WO | WO2009003634 | 1/2009 |

OTHER PUBLICATIONS

"Clusters: A Bridge Across the disciplines of Physics and Chemistry," P. Jena et al. PNAS (Jul. 11, 2006), vol. 103, No. 28, pp. 10560-10569.*

The Copper-Molybdenum Antagonism in Ruminants. III. Reaction of Copper(II) with Tetrathiomolybdate (VI), S. Laurie, D. Pratt, and J. B. Raynor, *Inorganic Chimica Acta*, vol. 123, pp. 193-196 (1986).

Polymeric ternary metal thiols I. Products from reaction of Cu(II) with $MoS_4^{2-}$, T. Ecclestone, I. Harvey, S. Laurie, M. Symons, F. Taiwo, *Inorganic Chemical Communications*, vol. 1, pp. 460-462 (1998).

Thiomolybdates—Simple but Very Versatile Reagents, S. Laurie, *Eur. J. Inorg. Chem.*, pp. 2443-2450 (2000).

Hydrodenitrogenation-Selective Catalysts, T.C. Ho, A. Jacobson, R. Chianelli, C. Lund, *Journal of Catalysis*, vol. 138, pp. 351-363 (1992).

Synthesis of tetraalkylammonium thiometallate precursors and their concurrent in situ activation during hydrodesulfurization of dibenzolhiophene, G. Alonzo et al., *Applied Catalysis A: General*, vol. 263, pp. 109-117 (2004).

Synthesis of tetraalkylammonium thiometallates in aqueous solution, G. Alonzo et al., Inorganica *Chimica Acta*, vol. 325, pp. 193-197 (2001).

Synthesis and Characterization of $Et_4N)_4[MoS_4Cu_{10}Cl_{12}]$: A Polynuclear Molybdenum-Copper Cluster Containing a Central Tetrahedral $MoS_4$ Encapsulated by Octahedral $Cu_6$ and Tetrahedral $Cu_4$ Arrays, Wu et al., *Inorg. Chem.*, vol. 35, pp. 1080-1082 (1996).

Preparation and Characterization of Cu(II), Zn(II) Sulfides Obtained by Spontaneous Precipitation in Electrolyte Solutions, D. Tsamouras et al., *Langmuir*, vol. 14, pp. 5298-5304 (1998).

Physicochemical Characteristics of Mixed Copper-Cadmium Sulfides Prepared by Coprecipitation, D. Tsamouras et al., *Langmuir*, vol. 15, pp. 8018-8024 (1999).

Properties of Cu(II) and Ni(II) Sulfides Prepared by Coprecipitation in Aqueous Solution, D. Tsamouras et al., *Langmuir*, vol. 15, pp. 7940-7946 (1999).

The synthesis and characterization of $Cu_2MX_4$ (M=W or Mo; X = S, Se or S/Se) materials prepared by a solvothermal method, C. Crossland, P. Hickey, & J. Evans, *Journal of Materials Chemistry*, vol. 15, pp. 3452-3458 (2005).

Mo(W,V)-Cu(Ag)-S(Se) Cluster Compounds, H-W. Hou, X-Q Xin, S. Shi, *Coordination Chemistry Reviews*, 153, pp. 25-56 (1996).

Molecular Architecture of Copper (I) Thiometallate Complexes, Example of a Cubane with an Extra Face, $(NPr_4)3[MS_4Cu_4Cl_5]$ (M=Mo, W), Y. Jeannin, F. Secheresse, S. Bernes, and F. Robert, *Inorganica Chimica Acta*, 198-200 pp. 493-505 (1992).

The Build-Up of Bimetallic Transition Metal Clusters, P. R. Raithby, *Platinum Metals Review*, 42(4) pp. 146-157 (1998).

New Aspects of Heterometallic Copper (Silver) Cluster Compounds Involving Sulfido Ligands, X. Wu, Q. Huang, Q. Wang, T. Sheng, and J. Lu, Chapter 17, *Transition Metal Sulfur Chemistry*, pp. 282-296, American Chemical Society (1996).

Properties of Biological Copper, Molybdenum, and Nickel Compounds, D. Pratt, Thesis, Leicester Polytechnic School of Chemistry (1985).

A combined in situ X-ray absorption spectroscopy and X-ray diffraction study of the thermal decomposition of ammonium tetrathiotungstate, R. Walton and S. Hibble, *J. Mater. Chem.*, vol. 9, pp. 1347-1355 (1999).

Polymers of $[MS_4]^{2-}$ (M=Mo, W) With Cu(I) and Ag(I): Synthesis and Characterization of $[Me_4N][CuMS_4]$ and $[Me_4N][AgMS_4]$ and Their Polymeric Chain Breaking Reactions with M'CN (M'=Cu, Ag) to Form Cluster Complexes, A. B. M. Shamshur Rahman et al., *Journal of Bangladesh Academy of Sciences*, vol. 30, No. 2, pp. 203-212 (2006).

Synthesis and Characterization of Copper (I) Tetrathiomo ybda es, V. Lakshmanan et al., *Indian Journal of Chemistry*, vol. 33A, pp. 772-774 (Aug. 1994).

Raman, Resonance Raman, and Infrared Spectroscopic Study of Complexes Containing Copper(I)-Tetrathio-Molybdate(VI) and —Tungstate(VI) Anions, Robin J. H. Clark et al., *J. Chem. Soc. Dalton Trans.*, pp. 1595-1601 (1986).

Complexes of $d^8$ Metals with Tetrathiomolybdate and Tetrathiotungstale Ions, Synthesis, Spectroscopy, and Electrochemistry, K. P. Callahan and P. A. Piliero, *Inorg. Chem.*, vol. 19, pp. 2619-2626 (1980).

Metal Sulfide Complexes and Clusters, D. Richard, G. Luther III, *Reviews in Mineralogy & Geochemistry*, vol. 61, pp. 421-504 (2006).

Properties of Some Solid Tetrathiomolybdates, G. M. Clark and W. P. Doyle, *J. Inorg. Nucl. Chem.*, vol. 28, pp. 281-385 (1966).

On the Preparation, Properties, and Structure of Cuprous Ammonium Thiomolybdate, W.P. Binnie, M.J. Redman, and W.J. Mallio, *Inorg. Chem.*, vol. 9, No. 6, pp. 1449-1452 (Jun. 1970).

Quasirelativistic Effects in the Electronic Structure of the Thiomolybdate and Thiotungstate Complexes of Nickel, Palladium, and Platinum, B.D. El-Issa and M.M. Zeedan, *Inorg. Chem.*, vol. 30, pp. 2594-2605 (1991).

Spongy chalcogels of non-platinum metals act as effective hydrodesulfurization catalysts, Santanu Bag et al., *Nature Chemistry*, DOI:10.1039/NCHEM.208, pp. 1-8 (Published Online www.nature.com: May 17, 2009).

Research on Soluble Metal Sulfides: From Polysulfido Complexes to Functional Models for the Hydrogenases, Thomas B. Rauchfuss, *Inorg. Chem.*, vol. 43, pp. 14-26 (2004).

* cited by examiner

NANO-TETRATHIOMETALLATE OR NANO-TETRASELENOMETALLATE MATERIAL

CROSS REFERENCE TO RELATED APPLICATION

The present application claims the benefit of priority from U.S. Provisional Patent Application Ser. No. 61/297,065.

FIELD OF THE INVENTION

The present invention is directed to a nano-thiometallate or nano-selenometallate material. In particular, the present invention is directed to a bimetallic or polymetallic thiometallate or selenometallate material having a particle size distribution with a median or mean particle size of from 50 nm to 5 μm.

BACKGROUND OF THE INVENTION

Increasingly, resources such as heavy crude oils, tar sands, shale oils, and coal are being utilized as hydrocarbon sources due to decreasing availability of easily accessed light sweet crude oil reservoirs. These resources are disadvantaged relative to light sweet crude oils, often containing significant amounts of sulfur, nitrogen, metals, and heavy hydrocarbon fractions including residue and asphaltenes. The disadvantaged crudes typically require a considerable amount of upgrading in order to obtain useful hydrocarbon products therefrom.

Numerous catalysts have been developed for catalytically hydrocracking and hydrotreating disadvantaged hydrocarbon feedstocks. Typically, these catalysts contain a Group VIB or Group VIII metal supported on a carrier formed of alumina, silica, or alumina-silica. Such catalysts are commonly sulfided to activate the catalyst, either before contacting the catalyst with a disadvantaged hydrocarbon feed or in situ with the disadvantaged hydrocarbon feed.

Applicants have discovered that a bimetallic or polymetallic thiometallate or selenometallate material is an exceptionally good catalyst for upgrading disadvantaged hydrocarbon feedstocks, particularly for converting all or substantially all heavy fractions such as residue and asphaltenes in the feedstock to lighter fractions while forming little or no coke. In particular, Applicants have discovered that bimetallic or polymetallic tetrathiomolybdates, tetrathiotungstates, and tetrathiovanadates and their tetraseleno-analogs are especially effective for hydrocracking disadvantaged hydrocarbon feedstocks to upgrade the feedstocks.

Catalysts used for hydrocracking and/or hydrotreating crudes or crude fractions are known to have higher catalytic activity as the surface area of the active component of the catalyst increases—more molecules in the crude or crude fraction may interact with surface of the active component. The surface area of an unsupported catalyst typically increases with decreasing catalyst particle size.

Ammonium and alkylammonium thiometallates have been used as precursors to produce metal sulfides. For example, tetralkylammonium thiomolybdate, tetralkylammonium thiotungstate, and ammonium thiomolybdate precursor compounds have been treated at temperatures of above 350° C. to thermally decompose the precursor compounds to produce $MoS_2$ and $WS_2$ disulfides having predicable stoichoimetry that have a high surface area and show substantial hydrodesulfurization and hydrodenitrogenation catalytic activity. Ammonium thiometallates have also been used as precursors to produce bimetallic compounds in an organic solvent. For example, copper thiometallates and copper selenometallates have been produced using a solvothermal method by reacting $(NH_4)_2MoS_4$, $(NH_4)_2WS_4$, $(PPh_4)_2MoSe_4$, or $(PPh_4)_2WSe_4$ with copper borofluoride salts in organic solvents at temperatures of 110° C. or above in an autoclave at autogenous pressures. Iron-molybdenum sulfide compounds have been produced by dissolving $(NH_4)_2MoS_4$ in an organic chelating solution of diethylenetriamine (dien) and slowly adding an iron salt in a 10% aqueous dien solution to precipitate a hydrodenitrogenation catalyst precursor. The precursor is thermally decomposed to remove organic ligand constituents and sulfactivate the catalyst. Copper thiomolybdates containing oxygen have been produced from ammonium tetrathiomolybdates and a copper salt by mixing aqueous solutions of reactants $CuSO_4 5H_2O$ and $M_2^I$-$MoS_4$ ($M^I$=$NH_4^+$, $Et_4N^+$, or $Na^+$) and $(NH_4)_2MoS_4$ in the presence of oxygen. Such methods are not known to produce bimetallic or polymetallic tetrathiometallates containing little or no oxygen and having a high surface area and/or a particle size distribution having a mean or median particle size of at least 50 nm but less than 5 μm.

Bimetallic tetrathiometallate or tetraselenometallate materials containing little or no oxygen and having a particle size distribution having a mean and/or median particle diameter of from 50 nm up to 5 μm are desirable to provide a high surface area material useful as a catalyst for hydrocracking and/or hydrotreating a crude oil or a crude oil fraction.

SUMMARY OF THE INVENTION

In one aspect, the present invention is directed to a composition comprising a solid material comprised of a first metal/metalloid comprised of a metal or metalloid selected from the group consisting of Cu, Fe, Ag, Co, Ni, Mn, Zr, Zn, Sn, Re, Rh, Ru, Pd, Ir, Pt, B, Al, Ce, La, Pr, Sm, Eu, Yb, Lu, Dy, Pb, Cd, Sb, Ge, Ga, In, Bi, and Au; and a second metal selected from molybdenum, tungsten, or vanadium; where at least a portion of the solid material is comprised of the first metal/metalloid and the second metal bridged by, and bonded to, sulfur or selenium atoms according to a formula selected from the group consisting of formula (I), formula (II), formula (III), and formula (IV):

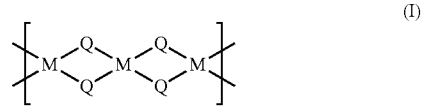
(I)

where M is either the first metal/metalloid or the second metal; at least one M is the first metal/metalloid and at least one M is the second metal; and Q is either sulfur or selenium;

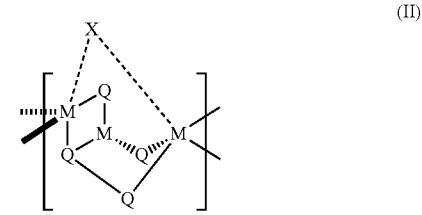
(II)

where M is either the first metal/metalloid or the second metal, at least one M is the first metal/metalloid and at least one M is the second metal, X is selected from the group consisting of SO$_4$, PO$_4$, oxalate (C$_2$O$_4$), acetylacetonate, acetate, citrate, tartrate, Cl, Br, I, ClO$_4$, ClO$_3$, and NO$_3$, and Q is either sulfur or selenium;

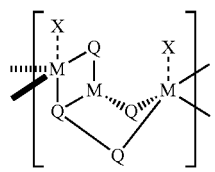

(III)

where M is either the first metal/metalloid or the second metal, at least one M is the first metal/metalloid and at least one M is the second metal, X is selected from the group consisting of SO$_4$, PO$_4$, oxalate (C$_2$O$_4$), acetylacetonate, acetate, citrate, tartrate, Cl, Br, I, ClO$_3$, ClO$_4$, and NO$_3$, and Q is either sulfur or selenium;

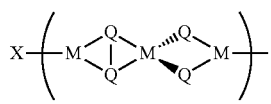

(IV)

where M is either the first metal/metalloid or the second metal, at least one M is the first metal/metalloid and at least one M is the second metal, X is selected from the group consisting of SO$_4$, PO$_4$, oxalate (C$_2$O$_4$), acetylacetonate, acetate, citrate, tartrate, Cl, Br, I, ClO$_3$, ClO$_4$, and NO$_3$, and Q is either sulfur or selenium; and where the solid material is comprised of particles and has a particle size distribution, where the mean particle size of the particle size distribution is from about 50 nm to about 5 μm.

In another aspect, the present invention is directed to a composition comprising a solid material comprised of a first metal/metalloid comprised of a metal or metalloid selected from the group consisting of Cu, Fe, Ag, Co, Mn, Zr, Zn, Sn, Re, Rh, Ru, Pd, Ir, Pt, B, Al, Ce, La, Pr, Sm, Eu, Yb, Lu, Dy, Pb, Cd, Sb, Ge, Ga, In, Bi, and Au; and a second metal selected from molybdenum, tungsten, or vanadium; where the solid material is comprised of at least three linked chain elements, the chain elements being comprised of a first chain element including the first metal/metalloid and having a structure according to formula (V) and a second chain element including the second metal and having a structure according to formula (VI)

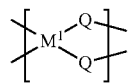

(V)

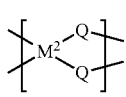

(VI)

where M$^1$ is the first metal/metalloid, M$^2$ is the second metal, and Q is either sulfur or selenium; where the solid material contains at least one first chain element and at least one second chain element; where at least a portion of the chain elements in the material are linked by bonds between the two sulfur or selenium atoms of a chain element and the metal or metalloid of an adjacent chain element; and where the solid material is comprised of particles and has a particle size distribution, where the mean particle size of the particle size distribution is from about 50 nm to about 5 μm.

DETAILED DESCRIPTION OF THE INVENTION

The present invention is directed to a solid tetrathiometallate or tetraselenometallate material. The tetrathiometallate or tetraselenometallate material may contains little or no oxygen, enhancing the catalytic activity of the material as an electron donor. The tetrathiometallate or tetraselenometallate material also has a solid particulate form and has a particle size distribution, where the mean and/or median particle size of the particle size distribution is from 50 nm up to 5 μm. The particle size distribution of the tetrathiometallate or tetraselenometallate material renders the material particularly useful as a catalyst for hydrocracking or hydrotreating a hydrocarbon feedstock, particularly a crude oil, and most particularly a disadvantaged crude oil containing a substantial quantity of high molecular weight hydrocarbons having a boiling point of at least 538° C. (1000° F.). The tetrathiometallate or tetraselenometallate material has a relatively large surface area as a result of the relatively small particle size of the material—which renders the material highly active as a catalyst since catalytic activity of a catalyst occurs at the interface of the catalyst surface and the reactants that contact the catalyst. The surface area of the tetrathiometallate or tetraselenometallate material is accessible for catalyzing hydrocracking of large, high molecular weight hydrocarbons since the material is not deposited in pores of a support material that would inhibit contact of the large, high molecular weight hydrocarbons with the tetrathiometallate or tetraselenometallate material.

Furthermore, the tetrathiometallate or tetraselenometallate material of the present invention has a particle size distribution such that the material has particles of sufficient particle size—a minimum mean or median particle size of at least 50 nm—to be easily be separated from a hydrocarbon feedstock, a hydrocarbon product, or a byproduct stream. As a result, the tetrathiometallate or tetraselenometallate material may be separated and recovered, preferably for regeneration and reuse, from a hydrocarbon feedstock, a hydrocarbon product, or a byproduct stream derived from hydrocracking or hydrotreating a hydrocarbon feedstock.

As used herein, the phrase "anaerobic conditions" means "conditions in which less than 0.5 vol. % oxygen is present". For example, a process that occurs under anaerobic conditions, as used herein, is a process that occurs in the presence of less than 0.5 vol. % oxygen. Anaerobic conditions may be such that no detectable oxygen is present.

The term "aqueous" as used herein is defined as containing more than 50 vol. % water. For example, an aqueous solution or aqueous mixture, as used herein, contains more than 50 vol. % water.

"ASTM" as used herein refers to American Standard Testing and Materials.

The term "dispersible" as used herein with respect to mixing a solid, such as a salt, in a liquid is defined to mean that the components that form the solid, upon being mixed with the liquid, are retained in the liquid for a period of at least 24 hours upon cessation of mixing the solid with the liquid. A solid material is dispersible in a liquid if the solid or its components are soluble in the liquid. A solid material is also dispersible in a liquid if the solid or its components form a colloidal dispersion or a suspension in the liquid.

The term "ligand" as used herein is defined as a molecule or ion attached to, or capable of attaching to, a metal ion in a coordination complex.

The term "monomer" as used herein is defined as a molecular compound that may be reactively joined with itself or another monomer in repeated linked units to form a polymer.

The term "polymer" as used herein is defined herein as a compound comprised of repeated linked monomer units.

As used herein, an element of the Periodic Table of Elements may be referred to by its symbol in the Periodic Table. For example, Cu may be used to refer to copper, Au may be used to refer to gold, Hg may be used to refer to mercury etc.

The term "soluble" as used herein refers to a substance a majority (e.g. greater than 50 wt. %) of which dissolves in a liquid upon being mixed with the liquid at a specified temperature and pressure. For example, a material dispersed in a liquid is soluble in the liquid if less than 50 wt. % of the material may be recovered from the liquid by centrifugation and filtration.

In an embodiment of the invention, the tetrathiometallate and/or tetraselenometallate material of the present invention may be comprised of a first metal/metalloid and a second metal, where the first metal/metalloid is comprised of a metal or metalloid selected from the group consisting of Cu, Fe, Ag, Co, Mn, Ni, Zr, Zn, Sn, Re, Rh, Ru, Pd, Ir, Pt, B, Al, Ce, La, Pr, Sm, Eu, Yb, Lu, Dy, Pb, Cd, Sb, Ge, Ga, In, Bi, and Au, or where the first metal/metalloid consists of a metal or metalloid selected from the group consisting of Cu, Fe, Ag, Co, Mn, Ni, Zr, Zn, Sn, Re, Rh, Ru, Pd, Ir, Pt, B, Al, Ce, La, Pr, Sm, Eu, Yb, Lu, Dy, Pb, Cd, Sb, Ge, Ga, In, Bi, and Au. The second metal is selected from molybdenum, tungsten, or vanadium. At least a portion of the tetrathiometallate or tetraselenometallate material may be comprised of the first metal/metalloid and the second metal bridged by, and bonded to, sulfur or selenium atoms according to a formula selected from the group consisting of formula (I), formula (II), formula (III), and formula (IV):

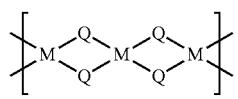

(I)

where M is either the first metal/metalloid or the second metal; at least one M is the first metal/metalloid and at least one M is the second metal; and Q is either sulfur or selenium;

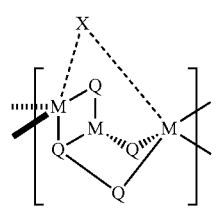

(II)

where M is either the first metal/metalloid or the second metal, at least one M is the first metal/metalloid and at least one M is the second metal, X is selected from the group consisting of $SO_4$, $PO_4$, oxalate ($C_2O_4$), acetylacetonate, acetate, citrate, tartrate, Cl, Br, I, $ClO_4$, $ClO_3$, and $NO_3$, and Q is either sulfur or selenium;

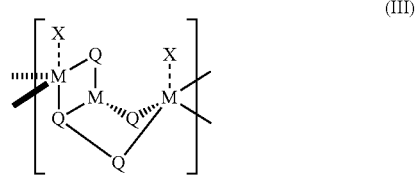

(III)

where M is either the first metal/metalloid or the second metal, at least one M is the first metal/metalloid and at least one M is the second metal, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, and Q is either sulfur or selenium; and

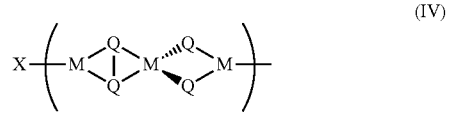

(IV)

where M is either the first metal/metalloid or the second metal, at least one M is the first metal/metalloid and at least one M is the second metal, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, and Q is either sulfur or selenium.

In another embodiment of the invention, the tetrathiometallate and/or tetraselenometallate material of the present invention may be comprised of a first metal/metalloid and a second metal, where the first metal/metalloid is comprised of a metal or metalloid selected from the group consisting of Cu, Fe, Ag, Co, Mn, Ni, Zr, Zn, Sn, Re, Rh, Ru, Pd, Ir, Pt, B, Al, Ce, La, Pr, Sm, Eu, Yb, Lu, Dy, Pb, Cd, Sb, Ge, Ga, In, Bi, and Au, or the first metal/metalloid consists of a metal or metalloid selected from the group consisting of Cu, Fe, Ag, Co, Mn, Ni, Zr, Zn, Sn, Re, Rh, Ru, Pd, Ir, Pt, B, Al, Ce, La, Pr, Sm, Eu, Yb, Lu, Dy, Pb, Cd, Sb, Ge, Ga, In, Bi, and Au. The second metal is selected from molybdenum, tungsten, or vanadium. The tetrathiometallate or tetraselenometallate material may be comprised of at least three linked chain elements, the chain elements being comprised of a first chain element including the first metal/metalloid and having a structure according to formula (V) and a second chain element including the second metal and having a structure according to formula (VI)

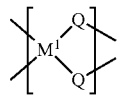

(V)

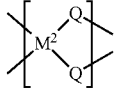

(VI)

where $M^1$ is the first metal/metalloid, $M^2$ is the second metal, and Q is either sulfur or selenium. The tetrathiometallate or tetraselenometallate material may contain at least one first chain element and at least one second chain element where at least a portion of the chain elements in the tetrathiometallate or tetraselenometallate material are linked by bonds between the two sulfur or selenium atoms of a chain element and the metal or metalloid of an adjacent chain element.

In another embodiment of the present invention, the tetrathiometallate or tetraselenometallate material of the present invention may be comprised of monomeric units that repeat in the material to form a polymer, where a monomeric unit is comprised of a first metal/metalloid comprised of a metal or metalloid selected from the group consisting of Cu, Fe, Ag, Co, Mn, Ni, Zr, Zn, Sn, Re, Rh, Ru, Pd, Ir, Pt, B, Al, Ce, La, Pr, Sm, Eu, Yb, Lu, Dy, Pb, Cd, Sb, Ge, Ga, In, Bi, and Au, or a first metal/metalloid consisting of a metal or metalloid selected from the group consisting of Cu, Fe, Ag, Co, Mn, Ni, Zr, Zn, Sn, Re, Rh, Ru, Pd, Ir, Pt, B, Al, Ce, La, Pr, Sm, Eu, Yb, Lu, Dy, Pb, Cd, Sb, Ge, Ga, In, Bi, and Au, and a second metal selected from the group consisting of molybdenum, tungsten and vanadium, where the first metal/metalloid and the second metal are bridged by, and bonded to, sulfur or selenium atoms according to a formula selected from the group consisting of formula (VII), formula (VIII), formula (IX), and formula (X):

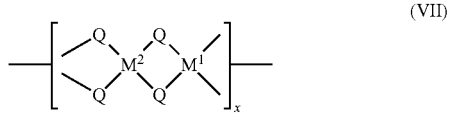
(VII)

where $M^1$ is the first metal/metalloid, $M^2$ is the second metal, Q is either sulfur or selenium, and x is at least 5;

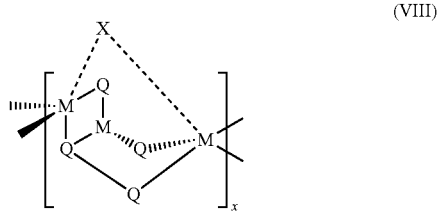
(VIII)

where M is either the first metal/metalloid or the second metal, at least one M is the first metal/metalloid and at least one M is the second metal, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, Q is either sulfur or selenium, and x is at least 5;

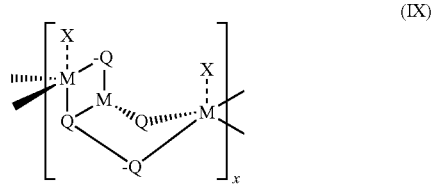
(IX)

where M is either the first metal/metalloid or the second metal, and at least one M is the first metal/metalloid and at least one M is the second metal, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, Q is either sulfur or selenium, and x is at least 5; and

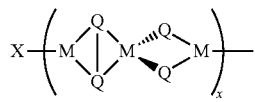
(X)

where M is either copper or the metal of the anionic component of the first salt, and at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, Q is either sulfur or selenium, and x is at least 5.

Furthermore, the tetrathiometallate or tetraselenometallate material may have a two-dimensional or three-dimensional polymeric structure with alternating metal centers comprised of the first metal and the second metal/metalloid bridged by two sulfur or two selenium atoms, where the first metal/metalloid is comprised of a metal or metalloid selected from the group consisting of Cu, Fe, Ag, Co, Mn, Ni, Zr, Zn, Sn, Re, Rh, Ru, Pd, Ir, Pt, B, Al, Ce, La, Pr, Sm, Eu, Yb, Lu, Dy, Pb, Cd, Sb, Ge, Ga, In, Bi, and Au, or the first metal/metalloid is selected from the group consisting of Cu, Fe, Ag, Co, Mn, Ni, Zr, Zn, Sn, Re, Rh, Ru, Pd, Ir, Pt, B, Al, Ce, La, Pr, Sm, Eu, Yb, Lu, Dy, Pb, Cd, Sb, Ge, Ga, In, Bi, and Au, and the second metal is selected from the group consisting of molybdenum, tungsten, and vanadium. The two- and/or three-dimensional polymeric structure of the tetrathiometallate or tetraselenometallate material may have "holes" in its structure, in which one or more of the metals or metalloids comprising the first metal/metalloid are missing as an alternating metal center in the polymeric structure. The two- and/or three-dimensional polymeric structure may contain a portion of the first metal/metalloid within interstices in the polymeric structure or in holes in the polymeric structure, where the portion of the first metal/metalloid located in the interstices or holes in the polymeric structure is not bonded with the second metal or with a sulfur or selenium atom in the polymeric structure.

A tetrathiometallate material of the present invention may comprise alternating $M^1S_4$ and $M^2S_4$ tetrahedral formations, where each tetrahedral formation shares at least two sulfur atoms with an adjacent tetrahedral formation, where $M^1$ is the first metal/metalloid and $M^2$ is second metal. The tetraselenometallate material of the present invention may comprise alternating $M^1Se_4$ and $M^2Se_4$ tetrahedral formations, where each tetrahedral formation shares at least two selenium atoms with an adjacent tetrahedral formation, where $M^1$ is the first metal/metalloid and $M^2$ is second metal.

The tetrathiometallate or tetraselenometallate material is typically at least partially crystalline, where the cystallinity of the material may be determined by x-ray powder diffraction. The tetrathiometallate or tetraselenometallate may be from 15% to 100% crystalline, or from 25% to 99% crystalline, of from 35% to 95% crystalline, or at least 20% crystalline, or at least 30% crystalline, or at least 40% crystalline, or at least 50%, or at least 60% crystalline, or at least 70% crystalline, or at least 80% crystalline. The tetrathiometallate or tetraselenometallate material typically has a tetrahedral crystalline structure.

The tetrathiometallate or tetraselenometallate material may comprise at most 0.1 wt. %, or at most 0.05 wt. %, or at most 0.01 wt. % oxygen. Oxygen content may be determined as measured by neutron activation, for example as determined in accordance with ASTM Method E385. In a preferred embodiment, oxygen is not detectable in the tetrathiometallate or tetraselenometallate material. Oxygen may be undesirable in the material when the material is to be used as a catalyst for hydrocracking a disadvantaged crude oil. The catalytic activity of the tetrathiometallate or tetraselenometallate material as a hydrocracking catalyst is, in part, believed to be due to the availability of electrons from the material to stabilize cracked molecules in the crude oil. Due to its electronegativity, oxygen tends to reduce the availability of electrons from the tetrathiometallate or tetraselenometallate material when it is present in the material in appreciable quantities.

The tetrathiometallate or tetraselenometallate material may contain at most 0.5 wt. %, or at most 0.1 wt. %, or at most 0.01 wt. % of an alkali metal or an alkaline earth metal. The alkali metal or alkaline earth metal content in the tetrathiometallate or tetraselenometallate may be measured by x-ray fluorescence. Alkali metals and/or alkaline earth metals may be an undesirable contaminants in the tetrathiometallate or tetraselenometallate material.

The tetrathiometallate or tetraselenometallate material may contain less than 0.5 wt. % of ligands other than the sulfur-metal bonded complexes between sulfur and the first metal/metalloid and between sulfur and the second metal, or selenium-metal bonded complexes between selenium and the first metal/metalloid and selenium and the second metal. Ligands, other than the sulfur-metal bonded complexes or selenium-metal bonded complexes with the first metal/metalloid and the second metal, may not be desirable in the tetrathiometallate or tetraselenometallate material since they may end-cap the material in the formation of the material and limit the particle size of the material to less than 50 nm.

The tetrathiometallate or tetraselenometallate material is particulate and has a particle size distribution. The particle size distribution may have a median and/or mean particle size of from 50 nm to 5 µm, or from 75 nm to 1 µm, or from 100 nm to 750 nm In an embodiment of the invention, the tetrathiometallate or tetraselenometallate material may have a particle size distribution with a mean and/or median particle size of from 50 nm up to 5 µm, or up to 1 µm, or up to 750 nm.

It is preferable that the tetrathiometallate or tetraselenometallate material have a particle size distribution with a mean and/or median particle size of at least 50 nm so that the material may be utilized as a catalyst in hydrocracking and/or hydrotreating a heavy crude oil and be easily separated from the hydrocarbon feedstock, hydrocarbon product, and/or a byproduct stream. If the tetrathiometallate or tetraselenometallate material has a mean and/or median particle size less than 50 nm, the material may be very difficult to separate, or may be inseparable, from the hydrocarbon feedstock, product, and/or byproduct stream when the material is used as a hydrocracking or hydrotreating catalyst since the small particle size material may form an inseparable suspension in the hydrocarbon feedstock, product, and/or byproduct stream.

The particulate tetrathiometallate or tetraselenometallate material has a particle size distribution having a mean and/or median particle size of at most 5 µm, more preferably of at most 1 µm or at most 750 nm, so that the material will have a relatively large surface area. A relatively large surface area is desirable when the tetrathiometallate or tetraselenometallate material is used as a catalyst in hydrocracking and/or hydrotreating a hydrocarbon feedstock to provide high catalytic activity. Particles of the tetrathiometalate or tetraselenometallate material may have a BET surface area of from 50 $m^2/g$ to 500 $m^2/g$, or from 100 $m^2/g$ to 350 $m^2/g$.

In order to form the tetrathiometallate or tetraselenometallate material, a first salt and a second salt may be mixed in an aqueous mixture under anaerobic conditions at a temperature of from 15° C. to 150° C., and the tetrathiometallate or tetraselenometallate material may be separated from the aqueous mixture.

The first salt utilized to produce the tetrathiometallate or tetraselenometallate includes a cationic component comprising a metal or metalloid in any non-zero oxidation state selected from the group consisting of Cu, Fe, Ag, Co, Mn, Re, Rh, Pd, Ir, Pt, B, Al, Ce, La, Pr, Sm, Eu, Yb, Lu, Dy, Ni, Zn, Bi, Sn, Pb, Cd, Sb, Ge, Ga, In, and Au. The cationic component of the first salt may consist essentially of a metal or metalloid in any non-zero oxidation state selected from the group consisting of Cu, Fe, Ag, Co, Mn, Re, Rh, Pd, Ir, Pt, B, Al, Ce, La, Pr, Sm, Eu, Yb, Lu, Dy, Ni, Zn, Bi, Sn, Pb, Cd, Sb, Ge, Ga, In, and Au. The metal or metalloid of the cationic component of the first salt must be capable of bonding with the anionic component of the second salt to form the tetrathiometallate or tetraselenometallate material in the aqueous mixture at a temperature of from 15° C. to 150° C. and under anaerobic conditions.

The first salt also contains an anionic component associated with the cationic component of the first salt to form the first salt. The anionic component of the first salt may be selected from a wide range of counterions to the cationic component of the first salt so long as the combined cationic component and the anionic component of the first salt form a salt that is dispersible, and preferably soluble, in the aqueous mixture in which the first salt and the second salt are mixed at the temperature at which they are mixed, and so long as the anionic component of the first salt does not prevent the combination of the anionic component of the second salt with the metal or metalloid of the cationic component of the first salt in the aqueous mixture to form the tetrathiometallate or tetraselenometallate material. Preferably, the anionic component of the first salt balances the charge of the cationic component of the first salt in the first salt. The anionic component of the first salt may be selected from the group consisting of sulfate, chloride, bromide, iodide, acetate, acetylacetonate, phosphate, oxalate, citrate, tartrate, chlorate, perchlorate, nitrate, and mixtures thereof.

The anionic component of the first salt may associate with or be incorporated into a polymeric structure including the cationic component of the first salt and the anionic component of the second salt to form the tetrathiometallate or tetraselenometallate material. For example, the anionic component of the first salt may complex with a polymeric structure formed of the cationic component of the first salt and the anionic component of the second salt as shown in formulas (VIII) and (IX) above, where X=the anionic component of the first salt, or may be incorporated into a polymeric structure including the cationic component of the first salt and the anionic component of the second salt as shown in formula (X) above, where X=the anionic component of the second salt.

Certain compounds are preferred for use as the first salt to produce the tetrathiometallate or tetraselenometallate material of the present invention. In particular, the first salt is preferably selected from the group consisting of $CuSO_4$, $CuCl_2$, copper acetate, copper acetylacetonate, $Cu(ClO_3)_2$, $Cu(ClO_4)_2$, $CuBr_2$, $Cu(NO_3)_2$, $FeSO_4$, $Fe_2(SO_4)_3$, $Fe(NO_3)_2$, $Fe(NO_3)_3$, $FeCl_2$, $FeCl_3$, iron acetate, iron acetylacetonate, $FeBr_2$, $Fe(ClO_4)_2$, $Fe(ClO_4)_3$, ferric citrate, $NiSO_4$, nickel acetate, nickel acetylacetonate, $NiCl_2$, $Ni(NO_3)_2$, $Ni(ClO_4)_2$, $Ni(ClO_3)_2$, $CoSO_4$, $CoCl_2$, cobalt acetate, cobalt acetylacetonate, $Co(NO_3)_2$, $Co(ClO_4)_2$, $CoI_2$, $CoBr_2$, $Co(ClO_3)_2$, $ZnCl_2$, $ZnSO_4$, zinc acetate, zinc acetylacetonate, $ZnBr_2$, $ZnI_2$, $Zn(NO_3)_2$, $Zn(ClO_3)_2$, $Zn(ClO_4)_2$, silver acetate, silver acetylacetonate, $AgClO_3$, $AgClO_4$, $AgNO_3$, $SnSO_4$, $SnCl_2$, tin acetate, tin acetylacetonate, $SnBr_2$, $Bi_2(SO_4)_3$, $BiCl_3$, bismuth acetate, bismuth acetylacetonate, and hydrates and mixtures thereof. These materials are generally commercially available, or may be prepared from commercially available materials according to well-known methods.

The first salt may be contained in an aqueous mixture or in an aqueous solution, where the aqueous solution or aqueous mixture containing the first salt (hereinafter the "first aqueous solution") may be mixed with the second salt or an aqueous solution or an aqueous mixture containing the second salt (hereinafter the "second aqueous solution") in the aqueous mixture to form the tetrathiometallate or tetraselenometallate material. The first salt is preferably dispersible, and most preferably soluble, in the first aqueous solution and is dispersible, and preferably soluble, in the aqueous mixture of the first and second salts at the temperature at which the first and second salts are mixed in the aqueous mixture. The first aqueous solution contains more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons selected from the group consisting of an alcohol, a diol, an aldehyde, a ketone, an amine, an amide, a furan, an ether, acetonitrile, and mixtures thereof. The organic solvent present in the first aqueous solution, if any, should be selected so that the organic compounds in the organic solvent do not inhibit reaction of the cationic component of the first salt with the anionic component of the second salt upon forming an aqueous mixture containing the first aqueous solution, e.g., by forming ligands or by reacting with the first or second salts or their respective cationic or anionic components. Preferably, the first aqueous solution contains no organic solvent. Most preferably the first aqueous solution consists essentially of water, most preferably deionized water, and the first salt, although the first aqueous solution may contain compounds other than the first salt, such as a buffer compound.

If the first salt is contained in a first aqueous solution, the concentration of the first salt in the first aqueous solution may be selected to promote formation of a tetrathiometallate or tetraselenometallate material having a particle size distribution with a small mean and/or median particle size and having a relatively large surface area per particle upon mixing the first salt and the second salt in the aqueous mixture. It has been found that decreasing the instantaneous concentration of the first salt and/or the second salt during mixing in the aqueous mixture produces a tetrathiometallate or tetraselenometallate material comprised of smaller particles relative to such materials produced from an aqueous mixture containing higher instantaneous concentrations of the first and second salts. The small tetrathiometallate or tetraselenometallate particles produced in this manner have a relatively large surface area. Preferably, the first aqueous solution may be prepared to contain at most 3 moles per liter, or at most 2 moles per liter, or at most 1 moles per liter, or at most 0.6 moles per liter, or at most 0.2 moles per liter of the first salt.

The second salt utilized to produce the tetrathiometallate or tetraselenometallate material includes an anionic component that is a tetrathiometallate or a tetraselenometallate. In particular, the second salt contains an anionic component that is selected from the group consisting of $MoS_4^{2-}$, $MoSe_4^{2-}$, $WS_4^{2-}$, $WSe_4^{2-}$, $VS_4^{3-}$, and $VSe_4^{3-}$.

The second salt also contains a cationic component associated with the anionic component of the second salt to form the second salt. The cationic component of the second salt may be selected from ammonium, alkyl ammonium, alkali metal and alkaline earth metal counterions to the tetrathiometallate or the tetraselenometallate anionic component of the second salt so long as the combined cationic component and the anionic component of the second salt form a salt that is dispersible, and preferably soluble, in the aqueous mixture in which the first salt and the second salt are mixed at the temperature at which the first and second salts are mixed, and so long as the cationic component of the second salt does not prevent the combination of the anionic component of the second salt with the cationic component of the first salt in the aqueous mixture to form the tetrathiomettalate or tetraselenometallate material. Preferably, the cationic component balances the charge of the anionic component in the second salt, and, preferably, the cationic component of the second salt comprises one or more sodium ions, one or more potassium ions, or one or more ammonium ions.

Certain compounds are preferred for use as the second salt used to form the material of the catalyst and/or the catalyst. In particular, the second salt is preferably selected from the group consisting of $Na_2MoS_4$, $Na_2WS_4$, $Na_3VS_4$, $K_2MoS_4$, $K_2WS_4$, $K_3VS_4$, $(NH_4)_2MoS_4$, $(NH_4)_2WS_4$, $(NH_4)_3VS_4$, $Na_4SnS_4$, $(NH_4)_4SnS_4$, $(NH_4)_3SbS_4$, $Na_3SbS_4$, and hydrates thereof.

The second salt may be a commercially available tetrathiomolybdate, tetrathiotungstate, or tetrathiovanadate salt. For example, the second salt may be ammonium tetrathiomolybdate, which is commercially available from AAA Molybdenum Products, Inc. 7233 W. 116 Pl., Broomfield, Colo., USA 80020, or ammonium tetrathiotungstate, which is commercially available from Sigma-Aldrich, 3050 Spruce St., St. Louis, Mo., USA 63103, or ammonium tetrathiovanadate, which is commercially available from Chemos GmbH, Germany.

Alternatively, the second salt may be produced from a commercially available tetrathiomolybdate, tetrathiotungstate, or tetrathiovanadate salt. For example, the second salt may be produced from ammonium tetrathiomolybdate or from ammonium tetrathiotungstate, or from ammonium tetrathiovanadate. The second salt may be formed from the commercially available ammonium tetrathiometallate salts by exchanging the cationic ammonium component of the commercially available salt with a desired alkali or alkaline earth cationic component from a separate salt. The exchange of the cationic components to form the desired second salt may be effected by mixing the commercially available salt and the salt containing the desired cationic component in an aqueous solution to form the desired second salt.

A method of forming the second salt is to disperse an ammonium tetrathiomolybdate, ammonium tetrathiotungstate, or ammonia tetrathiovanadate in an aqueous solution, preferably water, and to disperse an alkali metal or alkaline earth metal cationic component donor salt, preferably a carbonate, in the aqueous solution, where the cationic component donor salt is provided in an amount relative to the ammonium tetrathiomolybdate, ammonium tetrathiotungstate, or ammonium tetrathiovanadate salt to provide a stoichiometrically equivalent or greater amount of its cation to ammonium of the ammonium tetrathiomolybdate, ammonium tetrathiotungstate, or ammonium tetrathiovanadate salt. The aqueous solution may be heated to a temperature of at least 50° C., or at least 65° C. up to 100° C. to evolve ammonia from the ammonium containing salt and carbon dioxide from the carbonate containing salt as gases, and to form the second salt. For example a $Na_2MoS_4$ salt may be prepared for use as the second salt by mixing commercially available $(NH_4)_2MoS_4$ and $Na_2CO_3$ in water at a temperature of 70° C.-80° C. for a time period sufficient to permit evolution of a significant amount, preferably substantially all, of ammonia and carbon dioxide gases from the solution, typically from 30 minutes to 4 hours, and usually about 2 hours.

The second salt may be contained in an aqueous solution (the second aqueous solution, as noted above), where the second aqueous solution containing the second salt may be mixed with the first salt or a first aqueous solution containing the first salt in the aqueous mixture to form the tetrathiometallate or tetraselenometallate material of the present invention. The second salt is preferably dispersible, and most preferably soluble, in the second aqueous solution and is dispersible, and preferably soluble, in the aqueous mixture containing the first and second salts at the temperature at which the first and second salts are mixed. The second aqueous solution contains more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons and selected from the group consisting of an alcohol, a diol, an aldehyde, a ketone, an amine, an amide, a furan, an ether, acetonitrile, and mixtures thereof. The organic solvent present in the second aqueous solution, if any, should be selected so that the organic compounds in the organic solvent do not inhibit reaction of the anionic component of the second salt with the metal or metalloid of the cationic component of the first salt upon forming an aqueous mixture containing the second aqueous solution, e.g., by forming ligands or by reacting with the first or second salts or their respective cationic or anionic components. Preferably, the second aqueous solution contains no organic solvent. Most preferably the second aqueous solution consists essentially of water, preferably deionized, and the second salt, although the second aqueous solution may contain compounds other than the second salt, such as a buffer.

If the second salt is contained in a second aqueous solution, the concentration of the second salt in the second aqueous solution may be selected to promote formation of the tetrathiometallate or tetraselenometallate material having a particle size distribution with a small mean and/or median particle size, where the particles have a relatively large surface area, upon mixing the first salt and the second salt in the aqueous mixture. As noted above, it has been found that decreasing the instantaneous concentration of the first salt and/or the second salt during mixing in the aqueous mixture produces a tetrathiometallate or tetraselenometallate material comprised of smaller particles relative to such materials produced from an aqueous mixture containing higher instantaneous concentrations of the first and second salts, where the small particles have a relatively large surface area. Preferably, the second aqueous solution may contain at most 0.8 moles per liter, or at most 0.6 moles per liter, or at most 0.4 moles per liter, or at most 0.2 moles per liter, or at most 0.1 moles per liter of the second salt.

The first salt and the second salt are mixed in an aqueous mixture to form the tetrathiometallate or tetraselenometallate material. The amount of the first salt relative to the amount of the second salt provided to the aqueous mixture may be selected so that the atomic ratio of the cationic component metal or metalloid of the first salt to the metal of the anionic component of the second salt, either molybdenum or tungsten, is from 2:3 to 20:1, or from 1:1 to 10:1. The amount of the first salt and the second salt provided to the aqueous mixture may be selected so that the ratio of the cationic component metal or metalloid of the first salt to the metal of the anionic component of the second salt is at least 1.5:1, or at least 1.6:1, or at least 2:1, or more than 2:1 since selection of a ratio of less than 1.5:1 may lead to incorporation of a small quantity of the cationic component of the second salt in the solid material product.

In one method of producing the tetrathiometallate or tetraselenometallate material, an aqueous mixture of the first salt and the second salt may be formed by adding a solid form of the second salt to an aqueous solution containing the first salt (the first aqueous solution). Alternatively, the aqueous mixture of the first salt and the second salt may be formed by adding a solid form of the first salt to an aqueous solution containing the second salt (the second aqueous solution). The aqueous mixture of the first and second salts may also be formed by combining a first aqueous solution containing the first salt and a second aqueous solution containing the second salt. If desired, water—preferably deionized—may be added to the aqueous mixture formed by any of these methods to dilute the aqueous mixture and reduce the concentrations of the first and second salts in the aqueous mixture.

Preferably, the aqueous mixture of the first and second salts may be formed by adding the first salt and the second salt into an aqueous solution separate from both a first aqueous solution containing the first salt and a second aqueous solution containing the second salt. The separate aqueous solution will be referred to hereafter as the "third aqueous solution". The third aqueous solution may contain more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons and selected from the group consisting of an alcohol, a diol, an aldehyde, a ketone, an amine, an amide, a furan, an ether, acetonitrile, and mixtures thereof. The organic solvent present in the third aqueous solution, if any, should be selected so that the organic compounds in the organic solvent do not inhibit reaction of the anionic component of the second salt with the metal or metalloid of the cationic component of the first salt upon forming the aqueous mixture, e.g., by forming ligands or reacting with the anionic component of the second salt or with the cationic component of the first salt. Preferably, the third aqueous solution contains no organic solvent, and most preferably comprises deionized water.

The first salt and the second salt may be added as solids to the third aqueous solution. Alternatively, either the first salt in a first aqueous solution or the second salt in a second aqueous solution may be added to the third aqueous solution while adding the other salt in solid form to form the aqueous mixture. If desired, water may be added to the aqueous mixture formed by any of these methods to dilute the aqueous mixture and reduce the concentrations of the first and second salts in the aqueous mixture.

Most preferably, the aqueous mixture of the first and second salts may be formed by combining a first aqueous solution containing the first salt and a second aqueous solution containing the second salt in a third aqueous solution. The volume ratio of the third aqueous solution to the first aqueous solution containing the first salt may be from 0.5:1 to 50:1 where the first aqueous solution preferably contains at most 3, or at most 2, or at most 1, or at most 0.8, or at most 0.5, or at most 0.3 moles of the first salt per liter of the first aqueous solution. Likewise, the volume ratio of the third aqueous solution to the second aqueous solution containing the second salt may be from 0.5:1 to 50:1 where the second aqueous solution preferably contains at most 0.8, or at most 0.6, or at most 0.4, or at most 0.2, or at most 0.1, or at most 0.05 moles of the second salt per liter of the second aqueous solution.

The first salt and the second salt may be combined in the aqueous mixture, regardless of which method is selected to combine the first and second salts, so that the aqueous mixture containing the first and second salts contains at most 1.5, or at most 1.2, or at most 1, or at most 0.8, or at most 0.6 moles of the combined first and second salts per liter of the aqueous mixture. It has been found that the particle size of the tetrathiometallate or tetraselenometallate material produced by mixing the first and second salts in the aqueous mixture increases and the surface area of the particles decreases with increasing concentrations of the salts. Therefore, to limit the particle sizes in the particle size distribution of the tetrathiometallate or tetraselenometallate material and to increase the relative surface area of the particles, the aqueous mixture may contain at most 0.8 moles of the combined first and second salts per liter of the aqueous mixture, more preferably at most 0.6 moles, or at most 0.4 moles, or at most 0.2 moles of the combined first and second salts per liter of the aqueous mixture. The amount of the first salt and the total volume of the aqueous mixture may be selected to provide at most 1, or at most 0.8, or at most 0.4 moles of the cationic component of the first salt per liter of the aqueous mixture, and the amount of second salt and the total volume of the aqueous mixture may be selected to provide at most 0.4, or at most 0.2, or at most 0.1, or at most 0.01 moles of the anionic component of the second salt per liter of the aqueous mixture.

The rate of addition of the first salt and/or the second salt to the aqueous mixture may be controlled to limit the instantaneous concentration of the first salt and/or the second salt in the aqueous mixture to produce a tetrathiometallate or tetraselenometallate material comprised of relatively small particles having relatively large surface area. Limiting the instantaneous concentration of one or both salts in the aqueous mixture may reduce the mean and/or median particle size of the resulting tetrathiometallate or tetraselenometallate material by limiting the simultaneous availability of large quantities of the cationic components of the first salt and large quantities of the anionic components of the second salt that may interact to form a product material comprised primarily of relatively large particles. The rate of addition of the first salt and/or the second salt to the aqueous mixture may be controlled to limit the instantaneous concentration of the first salt and/or the second salt in the aqueous mixture to at most 0.05 moles per liter, or at most 0.01 moles per liter, or at most 0.001 moles per liter.

The rate of addition of the first salt and/or the second salt to the aqueous mixture may be controlled by limiting the rate of addition of a first aqueous solution containing the first salt and/or the rate of addition of a second aqueous solution containing the second salt to the aqueous mixture. The first aqueous solution containing the first salt may be added to the second aqueous solution containing the second salt, or the second aqueous solution may be added to the first aqueous solution, where the solution being added is added in a dropwise manner to the other solution. The rate of addition of drops of the first aqueous solution to the second aqueous solution or of drops of the second aqueous solution to the first aqueous solution may be controlled to provide the desired instantaneous concentration of the first salt or of the second salt in the aqueous mixture. Alternatively, the first aqueous solution containing the first salt may be dispersed directly into the second aqueous solution containing the second salt at a controlled flow rate to provide a desired instantaneous concentration of the first salt in the aqueous mixture. Or, the second aqueous solution containing the second salt may be dispersed directly into the first aqueous solution containing the first salt at a controlled flow rate selected to provide a desired instantaneous concentration of the second salt in the aqueous mixture. The first aqueous solution may be directly dispersed into the second aqueous solution or the second aqueous solution may be directly dispersed into the first aqueous solution at a selected controlled flow rate using conventional means for dispersing one solution into another solution at a controlled flow rate. For example, one solution may be dispersed through a nozzle located in the other solution, where the flow of the solution through the nozzle may be metered by a flow rate control device.

Preferably, the first aqueous solution containing the first salt and the second aqueous solution containing the second salt are added to a third aqueous solution, preferably simultaneously, at a controlled rate selected to provide a desired instantaneous concentration of the first salt and the second salt in the aqueous mixture. The first aqueous solution containing the first salt and the second aqueous solution containing the second salt may be added to the third aqueous solution at a controlled rate by adding the first aqueous solution and the second aqueous solution to the third aqueous solution in a dropwise manner. The rate that drops of the first aqueous solution and the second aqueous solution are added to the third aqueous solution may be controlled to limit the instantaneous concentration of the first salt and the second salt in the aqueous mixture as desired. Alternatively, the first aqueous solution containing the first salt and the second aqueous solution containing the second salt are dispersed directly into the third aqueous solution at a flow rate selected to provide a desired instantaneous concentration of the first salt and the second salt. The first aqueous solution and the second aqueous solution may be dispersed directly into the third aqueous solution using conventional means for dispersing one solution into another solution at a controlled flow rate. For example, the first aqueous solution and the second aqueous solution may be dispersed into the third aqueous solution through separate nozzles located within the third aqueous solution, where the flow of the first and second solutions through the nozzles is metered by separate flow metering devices.

The particle size distribution of the tetrathiometallate or tetraselenometallate material produced by mixing the first salt and the second salt in the aqueous mixture may be controlled by the rate of addition of the first salt and/or the second salt to the aqueous mixture, as described above, so that the median and/or mean particle size of the particle size distribution of the material falls within a range of from 50 nm to 5 $\mu$m. In a preferred embodiment, the particle size distribution of the solid material is controlled by the rate of addition of the first and/or second salts to the aqueous mixture so that the median and/or mean particle size of the particle size distribution of the material may range from at least 50 nm up to 1 $\mu$m, or up to 750 nm.

The surface area of the tetrathiometallate or tetraselenometallate material particles produced by mixing the first salt and the second salt in the aqueous mixture may also be controlled by the rate of addition of the first salt and/or the second salt to the aqueous mixture, as described above, so that the BET surface area of the solid material particles is from 50 $m^2/g$ to 500 $m^2/g$. In an embodiment, the surface area of the solid material particles is controlled by the rate of addition of the first salt and/or the second salt to the aqueous mixture so that the BET surface area of the solid material particles is from 100 $m^2/g$ to 350 $m^2/g$ The aqueous mixture of the first and second salts contains more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons and selected from the group consisting of an alcohol, a diol, an aldehyde, a ketone, an amine, an amide, a furan, an ether, acetonitrile, and mixtures thereof. The organic solvent present in the aqueous mixture, if any, should not inhibit reaction of the cationic component of the first salt with the anionic component of the second salt. Preferably, the aqueous mixture contains no organic solvent.

The aqueous mixture containing the first salt and the second salt is mixed to facilitate interaction and reaction of the anionic component of the second salt with the metal or metalloid of the cationic component of the first salt to form the tetrathiometallate or tetraselenometallate material. The aqueous mixture may be mixed by any conventional means for agitating a solution, for example by mechanical stirring.

During mixing, the temperature of the aqueous mixture is maintained in the range of from 15° C. to 150° C., or from 60° C. to 125° C., or most preferably from 65° C. to 100° C. Preferably, the temperature of the aqueous mixture during mixing is maintained at less than 100° C. so that the mixing may be conducted without the application of positive pressure necessary to inhibit the water in the aqueous mixture from becoming steam.

Maintaining the temperature of the aqueous mixture in a range of from 50° C. to 150° C. may result in production of a solid material having a relatively large surface area and a substantially reduced median or mean particle size relative to a solid material produced in the same manner at a lower temperature. It is believed that maintaining the temperature in the range of 50° C. to 150° C. drives the reaction of the metal or metalloid of cationic component of the first salt with the anionic component of the second salt, reducing the reaction time and limiting the time available for the resulting product to agglomerate prior to precipitation. Maintaining the temperature in a range of from 50° C. to 150° C. during the mixing of the first and second salts in the aqueous mixture may assist—in combination with the controlling the concentration of the first and second salts in the aqueous mixture—in production of the tetrathiometallate or tetraselenometallate material having a particle size distribution with a median or mean particle size of from 50 nm to 5 $\mu$m, or up to 1 $\mu$m, or up to 750 nm; or up to 500 nm, and having a BET surface area of from 50 $m^2/g$ up to 500 $m^2/g$ or from 100 $m^2/g$ to 350 $m^2/g$.

The aqueous mixture may be heated using any conventional means for heating a solution being mixed. For example, the aqueous mixture may be mixed in a jacketed mixing apparatus, where heat may be applied to the aqueous mixture by passing steam through the jacket of the mixing apparatus. If utilized, the first aqueous solution, second aqueous solution, and/or the third aqueous solution may be heated to a temperature within the desired range prior to forming the aqueous mixture by mixing the first and second salts.

The first and second salts in the aqueous mixture may be mixed under a pressure of from 0.101 MPa to 10 MPa (1.01 bar to 100 bar). Preferably, the first and second salts in the aqueous mixture are mixed at atmospheric pressure, however, if the mixing is effected at a temperature greater than 100° C. the mixing may be conducted under positive pressure to inhibit the formation of steam.

During mixing, the aqueous mixture is maintained under anaerobic conditions. Maintaining the aqueous mixture under anaerobic conditions during mixing inhibits the oxidation of the resulting tetrathiometallate or tetraselenometallate material or the anionic component of the second salt so that the tetrathiometallate or tetraselenometallate material produced contains little, if any oxygen other than oxygen present in the anionic component of the first salt if the anionic component of the first salt is incorporated into the structure of the tetrathiometallate or tetraselenometallate product. The aqueous mixture may be maintained under anaerobic conditions during mixing by conducting the mixing in an atmosphere containing little or no oxygen, preferably an inert atmosphere. The mixing of the first and second salts in the aqueous mixture may be conducted under nitrogen, argon, and/or steam to maintain anaerobic conditions during the mixing. Preferably, an inert gas, most preferably nitrogen or steam, is continuously injected into the aqueous mixture during mixing to maintain anaerobic conditions and to facilitate mixing of the first and second salts in the aqueous mixture and displacement of ammonia gas if the second salt contains an ammonium cation.

The first and second salts are mixed in the aqueous mixture at a temperature of from 15° C. to 150° C. under anaerobic conditions for a period of time sufficient to permit the formation of the tetrathiometallate or tetraselenometallate material. The first and second salts may be mixed in the aqueous mixture under these conditions for a period of at least 1 hour, or at least 2 hours, or at least 3 hours, or at least 4 hours, or from 1 hour to 10 hours, or from 2 hours to 9 hours, or from 3 hours to 8 hours, or from 4 hours to 7 hours to permit the formation of the tetrathiometallate or tetraselenometallate material. The first and/or second salt(s) may be added to the aqueous mixture over a period of from 30 minutes to 4 hours while mixing the aqueous mixture, and after the entirety of the first and second salts have been mixed into the aqueous mixture, the aqueous mixture may be mixed for at least an additional 1 hour, or 2 hours, or 3 hours or 4 hours, or 5 hours to permit the formation of the tetrathiometallate or tetraselenometallate material product.

After completing mixing of the aqueous mixture of the first and second salts, a solid is separated from the aqueous mixture to produce the bimetallic or polymetallic tetrathiometallate or tetraselenometallate material. The solid may be separated from the aqueous mixture by any conventional means for separating a solid phase material from a liquid phase material. For example, the solid may be separated by allowing the solid to settle from the resulting mixture, preferably for a period of from 1 hour to 16 hours, and/or by separating the solid from the mixture by vacuum or gravitational filtration or by centrifugation. To enhance recovery of the solid, water may be added to the aqueous mixture prior to allowing the solid to settle. In an embodiment, water may be added to the aqueous mixture in a volume relative to the volume of the aqueous mixture of from 0.1:1 to 0.75:1. Alternatively, the solid may be separated from the aqueous mixture by spray drying. Alternatively, but less preferably, the solid may be separated from the mixture by centrifugation without first allowing the solid to settle and/or without the addition of water.

The separated solid particulate tetrathiometallate or tetraselenometallate product may be washed subsequent to separating the solid from the aqueous mixture, if desired. The separated solid particulate tetrathiomettalate or tetraselenometallate material may be contaminated with minor amounts, typically less than 0.5 wt. %, of the anionic component from the first salt and/or the cationic component from the second salt. These minor contaminants may be removed from the separated solid material by washing the separated solid material with water. Substantial volumes of water may be used to wash the separated solid material since the separated solid particulate tetrathiometallate or tetraselenometallate material is relatively insoluble in water, and the yield of the product will not be significantly affected by the wash.

The optionally washed, separated, solid particulate tetrathiometallate or tetraselenometallate material product may be dried, if desired. The product may be dried by heating the material and/or by holding the material under vacuum. The material may be dried by heating to a temperature of from 35° C. to 75° C. under anaerobic conditions for a period of time sufficient to dry the material, typically from 12 hours to 5 days. The material may be dried by vacuum by holding the material under a vacuum for a period of from 12 hours to 5 days. Preferably the solid particulate tetrathiometallate or tetraselenometallate material is dried by heating to a temperature of from 35° C. to 75° C. under vacuum for a period of 2 to 4 days.

The tetrathiometallate or tetraselenometallate material may be produced from the first and second salts in relatively good yield. The tetrathiometallate or tetraselenometallate material may be produced at a yield of at least 45% up to 95%, or up to 90%, or up to 85% from the first and second salts.

EXAMPLE 1

A particulate solid material in accordance with the present invention containing copper-molybdenum-sulfur was produced. $Na_2MoS_4$ was produced from $(NH_4)_2MoS_4$ by heating a solution formed 260.3 g of $(NH_4)_2MoS_4$ dissolved in 7.6 liters of deionized water to a temperature of 60° C., adding a solution of 212 g of $Na_2CO_3$ in 600 ml of deionized water to the $(NH_4)_2MoS_4$ solution, then heating the mixture to a temperature of 75° C. for 1 hour. An aqueous copper sulfate solution was also prepared by mixing 1798.7 g of $CuSO_4$ with enough deionized water to make a 4 liter solution.

A separate 22 liter vessel was charged with 7.6 liters of deionized water at room temperature (26° C.) and mechanical stirring was commenced. Over a period of two hours, both the $Na_2MoS_4$ solution and the $CuSO_4$ solution were injected simultaneously from opposite sides of the 22 liter vessel to be mixed in the 22 liter vessel, where the $CuSO_4$ solution was injected through a 2"×0.02" nozzle and the $Na_2MoS_4$ solution was injected through a 1/16" nozzle. After the addition of the $Na_2MoS_4$ and the $CuSO_4$ solutions to the 22 liter vessel was complete, the mixture was stirred overnight (approximately 12 hours). A particulate solid product material was separated from the mixture by centrifugation at 8000 G. The particulate solid material was washed with water until the pH of the wash was about 6 and the wash had a conductivity of less than 100 μS at 32° C. The washed particulate solid material was then dried under vacuum. 303 grams of particulate solid material product was recovered. X-ray fluorometry showed that the solid material product contained, on a mass % basis, 31.7% Cu, 19.7% Mo, 31.7% S, and 0.13 Cl. X-ray diffraction and Raman IR spectroscopy showed that at least a portion of the solid material had a structure in which copper, sulfur, and molybdenum were arranged as shown in Formula (V):

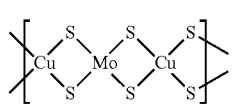
(V)

The solid material had a particle size distribution, as set forth in Table 1:

TABLE 1

| Particle size (μm) | Volume % |
|---|---|
| 0.050 | 0.07 |
| 0.055 | 0.10 |
| 0.061 | 0.19 |
| 0.067 | 0.29 |
| 0.074 | 0.41 |
| 0.082 | 0.56 |
| 0.090 | 0.74 |
| 0.099 | 0.95 |
| 0.109 | 1.19 |
| 0.121 | 1.47 |
| 0.133 | 1.76 |
| 0.147 | 2.07 |
| 0.162 | 2.40 |
| 0.178 | 2.75 |
| 0.196 | 3.10 |
| 0.217 | 3.45 |
| 0.239 | 3.78 |
| 0.263 | 4.10 |
| 0.290 | 4.38 |
| 0.320 | 4.62 |
| 0.353 | 4.81 |
| 0.389 | 4.94 |
| 0.429 | 5.01 |
| 0.473 | 4.98 |
| 0.522 | 4.87 |
| 0.576 | 4.69 |
| 0.635 | 4.42 |
| 0.700 | 4.08 |
| 0.772 | 3.67 |
| 0.851 | 3.23 |
| 0.938 | 2.77 |
| 1.03 | 2.32 |
| 1.14 | 1.92 |
| 1.26 | 1.58 |
| 1.39 | 1.30 |
| 1.53 | 1.10 |
| 1.69 | 0.94 |
| 1.86 | 0.82 |
| 2.05 | 0.73 |
| 2.26 | 0.65 |
| 2.49 | 0.57 |
| 2.75 | 0.50 |
| 3.03 | 0.43 |
| 3.34 | 0.35 |
| 3.69 | 0.29 |
| 4.07 | 0.23 |
| 4.48 | 0.18 |
| 4.94 | 0.13 |
| 5.45 | 0.06 |
| 6.01 | 0.03 |
| >6.63 | 0 |

The particle size distribution had a mean particle size of 0.45 μm. The BET surface area of the particulate solid material product was determined to be 130 $m^2/g$.

EXAMPLE 2

A copper tetrathiomolybdate composition having a formula according to formula (V) above was produced. A solution containing 500 grams (1.9 moles) of $(NH_4)_2MoS_4$ in 6 liters of water was added to 2089 grams (2.1 moles) of $CuSO_4$ in 14 liters of water in a glass reactor at 87-95° C. under nitrogen. Addition of the $(NH_4)_2MoS_4$ solution to the $CuSO_4$ was effected in 45 minutes by injecting the $(NH_4)_2MoS_4$ solution into the $CuSO_4$ through a nozzle. The mixture was then cooled to 63° C. and stirred for 15 hours. A dark precipitate formed during the mixing. The solids were separated from the mixture by continuous centrifuge at 12,000 gauss. The resulting solid cake was dried under vacuum at 60° C. and yielded 672 grams of product. The solid product was particulate and was found to have a particle size distribution with a mean particle size of 1.10 μm as determined by laser diffractometry using a Mastersizer S made by Malvern Instruments.

EXAMPLE 3

A copper tetrathiomolybdate composition having a formula according to formula (V) was produced. The same procedure was followed as set forth in Example 2 except that the reaction temperature was maintained at 81° C., the total water volume was 19 liters, and the solid material was washed thoroughly with deionized water after separation from the slurry. The recovered solids were washed with deionized water until the liquid wash effluent had a pH of 7 and a conductivity of 1.67 mS at 22° C. The solid product was dried under vacuum at 60° C. and 644 grams of product was recovered. Semi-Quantitative XRF of the product solid measured, on a mass basis: 27.532% S; 0.209% Cl; 0.034% Cr; 0.098% Fe; 25.861% Cu; and 25.598% Mo. The solid product was particulate and was found to have a particle size distribution with a mean particle size of between 0.7 to 1.0 μm. as determined by laser diffractometry using a Mastersizer S made by Malvern Instruments.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed is:

1. A composition comprising:
a solid material, comprised of:
a first metal/metalloid comprised of a metal or metalloid selected from the group consisting of Cu, Fe, Ag, Co, Ni, Mn, Zr, Zn, Sn, Re, Rh, Ru, Pd, Ir, Pt, B, Al, Ce, La, Pr, Sm, Eu, Yb, Lu, Dy, Pb, Cd, Sb, Ge, Ga, In, Bi, and Au; and
a second metal selected from molybdenum, tungsten, or vanadium; where at least a portion of the solid material is comprised of the first metal/metalloid and the second metal bridged by, and bonded to, sulfur or selenium atoms according to a formula selected from the group consisting of formula (I), formula (II), formula (III), and formula (IV):

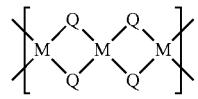

(I)

where M is either the first metal/metalloid or the second metal; at least one M is the first metal/metalloid and at least one M is the second metal; and Q is either sulfur or selenium;

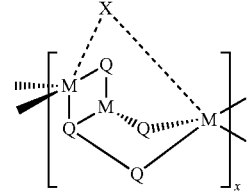

(II)

where M is either the first metal/metalloid or the second metal, at least one M is the first metal/metalloid and at least one M is the second metal, X is selected from the group consisting of $SO_4$, $PO_4$, oxalate ($C_2O_4$), acetylacetonate, acetate, citrate, tartrate, Cl, Br, I, $ClO_4$, $ClO_3$, and $NO_3$, and Q is either sulfur or selenium;

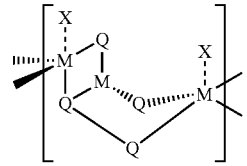

(III)

where M is either the first metal/metalloid or the second metal, at least one M is the first metal/metalloid and at least one M is the second metal, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, and Q is either sulfur or selenium;

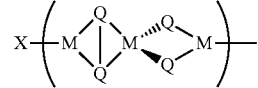

(IV)

where M is either the first metal/metalloid or the second metal, at least one M is the first metal/metalloid and at least one M is the second metal, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, and Q is either sulfur or selenium; and
where the solid material is comprised of particles and has a particle size distribution, where the mean particle size of the particle size distribution is from about 50 nm to about 5 μm.

2. The composition of claim 1 wherein the solid material has a BET surface area of from 50 $m^2/g$ to 500 $m^2/g$.

3. The composition of claim 1 wherein the solid material has a particle size distribution with a median particle size of from about 50 nm to about 5 μm.

4. The composition of claim 1 wherein the solid material has a particle size distribution in which the mean particle size of the particle size distribution is from about 75 nm to about 1 µm.

5. The composition of claim 1 wherein the solid material contains at most about 0.01 wt. % oxygen.

6. The composition of claim 1 wherein the solid material contains less than 0.5 wt. % of an alkali metal or an alkaline earth metal.

7. The composition of claim 1 wherein the solid material is at least 50% crystalline.

8. The composition of claim 1 wherein the solid material contains less than 0.5 wt. % of ligands other than sulfur-metal bonded complexes between sulfur and the first metal/metalloid or between sulfur and the second metal, or selenium-metal bonded complexes between selenium and the first metal/metalloid or between selenium and the second metal.

9. The composition of claim 1 wherein at least a portion of the solid material is comprised of the first metal/metalloid and the second metal bridged by, and bonded to, sulfur or selenium atoms according to a formula selected from the group consisting of formula (VII), formula (VIII), formula (IX), and formula (X):

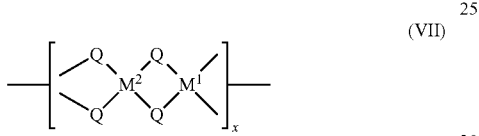

(VII)

where $M^1$ is the first metal/metalloid, $M^2$ is the second metal, Q is either sulfur or selenium, and x is at least 5;

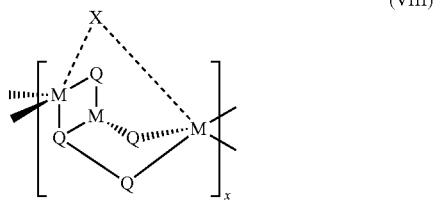

(VIII)

where M is either the first metal/metalloid or the second metal, at least one M is the first metal/metalloid and at least one M is the second metal, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, Q is either sulfur or selenium, and x is at least 5;

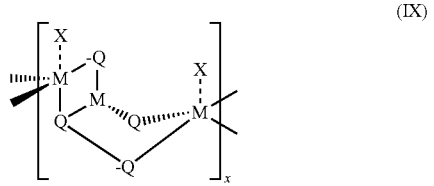

(IX)

where M is either the first metal/metalloid or the second metal, and at least one M is the first metal/metalloid and at least one M is the second metal, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, Q is either sulfur or selenium, and x is at least 5; and

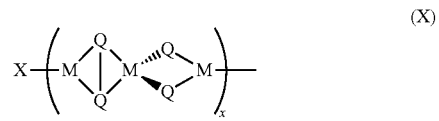

(X)

where M is either copper or the metal of the anionic component of the first salt, and at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, Q is either sulfur or selenium, and x is at least 5.

10. A composition, comprising:
a solid material comprised of:
a first metal/metalloid comprised of a metal or metalloid selected from the group consisting of Cu, Fe, Ag, Co, Mn, Zr, Zn, Sn, Re, Rh, Ru, Pd, Ir, Pt, B, Al, Ce, La, Pr, Sm, Eu, Yb, Lu, Dy, Pb, Cd, Sb, Ge, Ga, In, Bi, and Au; and
a second metal selected from molybdenum, tungsten, or vanadium;
where the solid material is comprised of at least three linked chain elements, the chain elements being comprised of a first chain element including the first metal/metalloid and having a structure according to formula (V) and a second chain element including the second metal and having a structure according to formula (VI)

(V)

(VI)

where $M^1$ is the first metal/metalloid, $M^2$ is the second metal, and Q is either sulfur or selenium; where the solid material contains at least one first chain element and at least one second chain element;
where at least a portion of the chain elements in the material are linked by bonds between the two sulfur or selenium atoms of a chain element and the metal or metalloid of an adjacent chain element; and
where the solid material is comprised of particles and has a particle size distribution, where the mean particle size of the particle size distribution is from about 50 nm to about 5 µm.

11. The composition of claim 10 wherein the solid material has a BET surface area of from 50 m²/g to 500 m²/g.

12. The composition of claim 10 wherein the solid material has a particle size distribution with a median particle size of from about 50 nm to about 5 µm.

13. The composition of claim 10 wherein the solid material has a particle size distribution with a mean particle size of from about 75 nm to about 1 µm.

14. The composition of claim 10 wherein the solid material contains at most about 0.01 wt. % oxygen.

15. The composition of claim 10 wherein the solid material contains less than 0.5 wt. % of an alkali metal or an alkaline earth metal.

16. The composition of claim 10 wherein the solid material is at least 50% crystalline.

17. The composition of claim 10 wherein the solid material contains less than 0.5 wt. % of ligands other than sulfur-metal bonded complexes between sulfur and the first metal/metalloid or between sulfur and the second metal, or selenium-metal bonded complexes between selenium and the first metal/metalloid or between selenium and the second metal.

* * * * *